(12) United States Patent
Aziz et al.

(10) Patent No.: US 8,359,301 B2
(45) Date of Patent: Jan. 22, 2013

(54) NAVIGATING PRODUCT RELATIONSHIPS WITHIN A SEARCH SYSTEM

(75) Inventors: Imran Aziz, Seattle, WA (US); Chi Pong Timothy Leung, San Bruno, CA (US); Yan-Feng Sun, Beijing (CN)

(73) Assignee: Microsoft Corporation, Redmond, WA (US)

( * ) Notice: Subject to any disclaimer, the term of this patent is extended or adjusted under 35 U.S.C. 154(b) by 518 days.

(21) Appl. No.: 12/130,495

(22) Filed: May 30, 2008

(65) Prior Publication Data

US 2009/0299965 A1    Dec. 3, 2009

(51) Int. Cl.
G06F 17/30    (2006.01)
(52) U.S. Cl. ........................ 707/706; 707/758
(58) Field of Classification Search .................. 707/706, 707/758
See application file for complete search history.

(56) References Cited

U.S. PATENT DOCUMENTS

| 7,080,064 B2 | 7/2006 | Sundaresan |
| 2005/0160013 A1 | 7/2005 | Schechinger |
| 2005/0197893 A1 | 9/2005 | Landau |
| 2006/0143158 A1 | 6/2006 | Ruhl |
| 2006/0218156 A1 | 9/2006 | Schechinger |
| 2007/0078850 A1 | 4/2007 | Aziz |

FOREIGN PATENT DOCUMENTS

| WO | 0152126 A2 | 7/2001 |
| WO | 2007056799 A1 | 5/2007 |

OTHER PUBLICATIONS

Liu, Bing, et al., Opinion Observer: Analyzing and Comparing Opinions on the Web; University of Illinois at Chicago, http://www2005.org/cdrom/docs/p342.pd.

Hu, Minqing, et al., Mining and Summarizing Customer Reviews; University of Illinois at Chicago, http://portal.acm.org/citation.cfm?id=1014073&dl=.

Sun, Jian-Tao, et al., CWS: A Comparative Web Search System; http://www2006.org/programme/files/xhtml/3020/3020-sun/3020-sun.html.

Popescu, Ana-Maria, et al., Extracting Product Features and Opinions from Reviews; University of Washington, http://www.cs.washington.edu/homes/etzioni/papers/emnlp05_opine.pdf.

Ghose, Anindya, et al., Designing Ranking Systems for Consumer Reviews: The Impact of Review Subjectivity on Product Sales and Review Quality; New York University, http://pages.stern.nyu.edu/~aghose/wits2006.pdf.

*Primary Examiner* — Huawen Peng
(74) *Attorney, Agent, or Firm* — Shook, Hardy & Bacon L.L.P.

(57) ABSTRACT

Embodiments of the present invention relate to aggregating product information from a variety of sources to generate user interfaces that allow users to navigate and discover products. Product information is aggregated from both feed and crawl sources, and product entities are identified within the aggregate product information. In some embodiments, product entities are associated with product classes, and product class detail pages are generated that include product entities within each product class and allow users to view correlations between those produce entities. In some embodiments, relationships are identified between product entities. When a user selects to view information for a given product entity, information is provided indicating similar product entities that have a relationship with the given product entity.

18 Claims, 10 Drawing Sheets

FIG. 4.

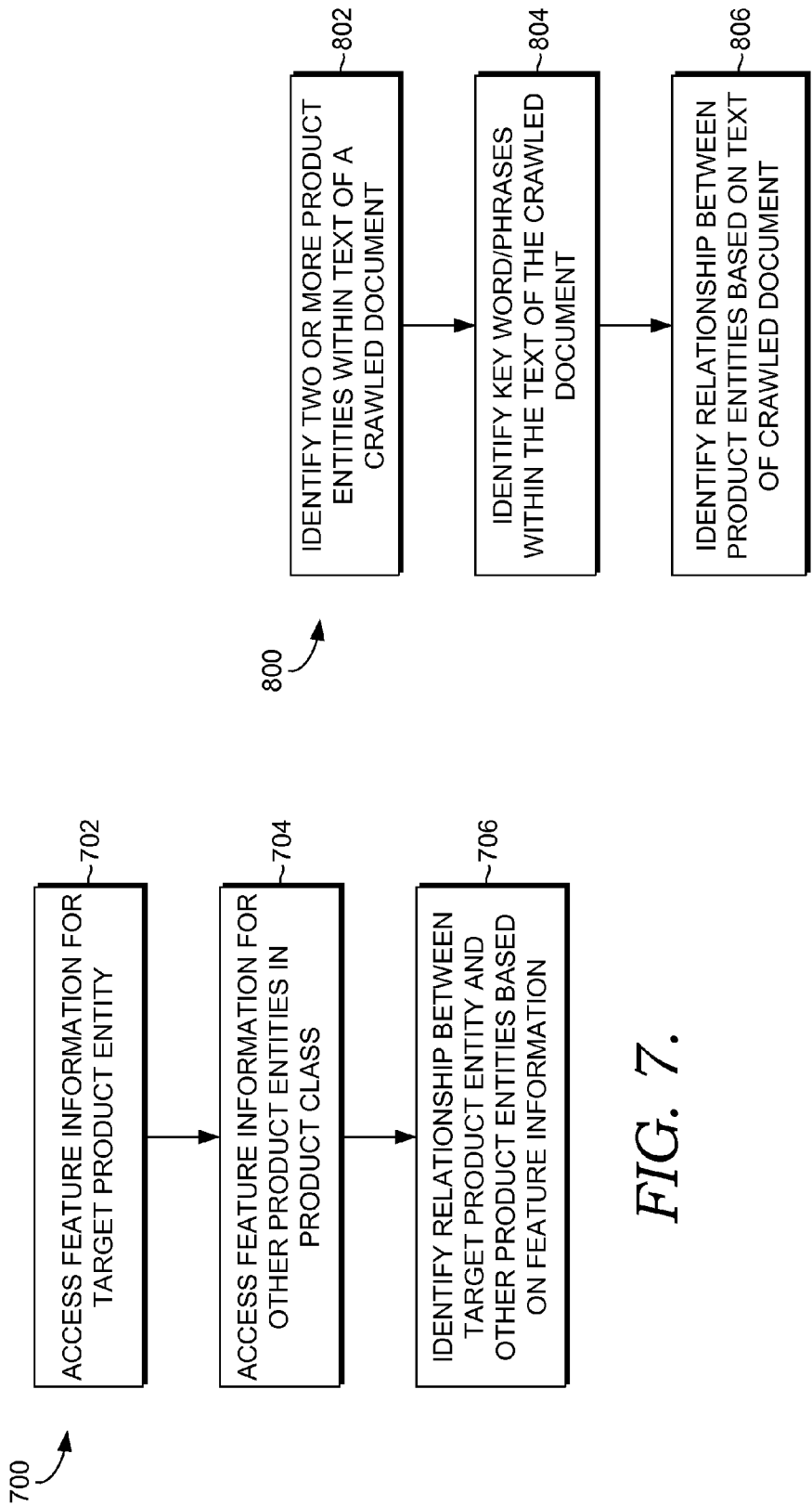

NAVIGATING PRODUCT RELATIONSHIPS WITHIN A SEARCH SYSTEM

BACKGROUND

Although a wealth of product information is available to users online, it can often be difficult for users to quickly and effectively discover and explore related products and/or competing products that they should consider as part of their shopping experience. This is especially true when a user is looking to explore a product category unfamiliar to the user and the user may wish to better understand the options that are available before making a purchase decision.

Currently, if a user does not know the particular product he/she is interested in, the user can search for the product class (such as 'digital camera') on the web using a search engine. The user will see a list of web search results which are textually most 'relevant' to the words 'digital camera" and/or a list of digital camera offers aggregated from various e-commerce sites. However, the user cannot see a summary view which categorizes relevant digital cameras into brands, product lines, or feature sets easily. Additionally, for web search results, the search engine often returns a large number of documents or web pages. The user is then left to sift through the list of documents, links, and associated information to find desired information. This process can be cumbersome, frustrating, and time consuming for the user.

Alternatively, if the user has a target product in mind, the user can start by searching for that particular product name. For instance, the user may employ a shopping search engine to find some description, reviews and offers information about the product scattered across a number of web sites. However, there exists no effective and consistent way for the user to discover comparable products across brands, product lines, and price classes that they should consider as an alternative.

The user may also go to a general shopping site and browse through the relevant products under the category they are interested in to read more information about that category of products. The problem with this approach is that the useful grouping of products is presented in a traditional browse hierarchy and requires a fair amount of navigating through the site structure before the user can comprehend the holistic groupings, i.e., the inter-relationship of products within a product class.

As a further alternative, the user may employ a niche site specializing in a certain product class and learn about all the various product models. The obvious problem with this is that the user is assumed to have prior knowledge of which is the authoritative or trusted site specializing in a particular product class. However, that assumption does not hold when a user was not an expert in that area to begin with. Secondly, building these expert sites requires a significant amount of editorial effort and expert knowledge to maintain its quality and freshness.

In some instances, the user can find a comparable product or other related product recommendation from general shopping sites when they're researching about a certain product. A general shopping site providing such relationship information typically only collects and summarizes data based on the behavior of their own users, so it is not representative of the entire Internet and therefore the entire market. Additionally, the recommendations are typically in a form of a flat list with no notion of the relationships between brand lines, quality, comparable products, etc.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to accessing product information from a variety of sources, including information obtained from feed sources and information obtained by crawling web documents. The product information is aggregated, and product entities are identified within the aggregate product information. In some embodiments, product entities are associated with product classes, and product class detail pages are generated that include product entities within each product class and allow users to view correlations between those produce entities. In some embodiments, relationships are identified between product entities. When a user selects to view information for a given product entity, information is provided indicating similar product entities that have a relationship with the given product entity.

BRIEF DESCRIPTION OF THE DRAWINGS

The present invention is described in detail below with reference to the attached drawing figures, wherein:

FIG. 4 is an illustrative screen display showing a product class detail page in accordance with an embodiment of the present invention;

FIG. 7 is a flow diagram showing a method for feature information to identify product relationships in accordance with an embodiment of the present invention;

FIG. 8 is a flow diagram showing a method for analyzing text of crawled documents to identify product relationships in accordance with an embodiment of the present invention;

DETAILED DESCRIPTION

Figure 1:
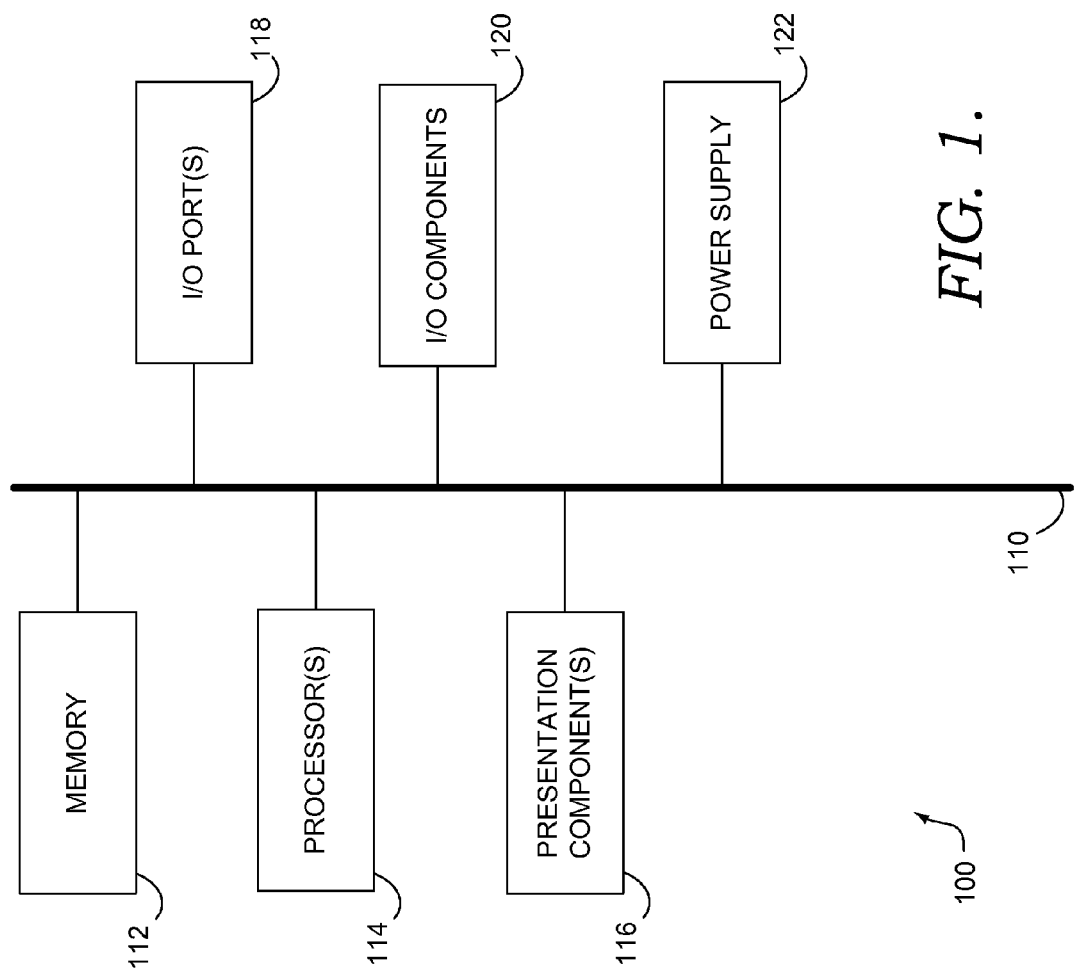
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide for, among other things, a search engine that aggregates product information from a variety of information sources and generates user interfaces that allow users to intuitively discover and navigate product relationships. Product information is obtained by crawling documents available on the Internet and by receiving information from feeds from entities such as manufacturers and retailers. Product entities and information associated with each product entity are identified from the aggregate product information. As used herein, the term "product entity" refers to a specific product. A product entity may be identified by brand (e.g., Canon) and model name (e.g., PowerShot G7), as well as any other descriptive information necessary to differentiate a given product entity from other product entities. Additionally, each product entity is associated with a particular product class. As used herein, the term "product class" refers to a grouping of a similar type of product entities. For instance, product classes may include digital cameras, MP3 players, flat panel televisions, etc.

In some embodiments of the present invention, product entities are grouped by product class and correlations among the product entities are identified. A product class detail page is then generated for each product class that provides information regarding product entities within the product class, including correlations among the product entities. When a search engine receives a search query that includes search terms corresponding with the product class, the product class detail page for the product class identified from the search terms is returned as a result for the search query. For instance, if a user submits a search query that includes the terms "digital cameras," a digital camera detail page is provided as a result for the search query.

In other embodiments of the present invention, specific relationships between a target product entity and other product entities are identified. In some embodiments, a product entity may be identified as a competitive product from a different brand for the target product entity, an upgraded product from the same brand as the target product entity, a downgraded product from the same brand as the target product entity, or a newer/older version of the target product entity. When information regarding the target product entity is requested, a user interface is provided that indicates product entities having a relationship with the target product entity and the type of relationship for each product entity. For instance, the user interface may identify competitive product entities from other brands, an upgraded product entity from the same brand, and a downgraded entity from the same brand.

Accordingly, in one aspect, an embodiment of the present invention is directed to one or more computer-storage media embodying computer-useable instructions for performing a method. The method includes accessing an aggregate input data set of product information regarding a number of product entities. The product information is received from a number of sources of product information, including feed sources and crawl sources. The method also include identifying the product entities within the product information. The method further includes identifying at least one relationship between a target product entity and at least one other product entity based on the product information. The method still further includes providing product relationship information for presentation to a user, the product relationship information including the relationship identified between the target product entity and the other product entity.

In another aspect, an embodiment is directed to one or more computer-storage media embodying computer-useable instructions for performing a method. The method includes accessing product information from a number of sources, including feed sources and crawl sources. The method also includes identifying a number of product entities within the product information and selecting a target product entity. The method further includes identifying a subset of other product entities having a relationship with the target product entity by examining text of documents from crawl sources. A relationship between the target product entity and an other product entity is determined by identifying the target product entity and the other product entity within the text of a document and identifying the presence of a key phrase within the text of the document, the key phrase being indicative of a type of relationship between the target product entity and the other product entity. The method still further includes providing product relationship information for the target product entity for presentation to a user, wherein the product relationship information includes the subset of other product entities having a relationship with the target product entity and specifies a type of relationship between the target product entity and each of the other product entities.

A further embodiment of the present invention is directed to one or more computer-storage media embodying computer-useable instructions for performing a method. The method includes accessing product information from a number of sources, including both feed sources and crawl sources. The method also includes identifying product entities within the product information and determining correlations among product entities within the product information. The method further includes indexing information regarding the product entities and the correlations among the product entities. The method still further includes generating a product class detail page by identifying a subset of product entities associated with a given product class and summarizing product information for the subset of product entities including correlations identified within the subset of product entities.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
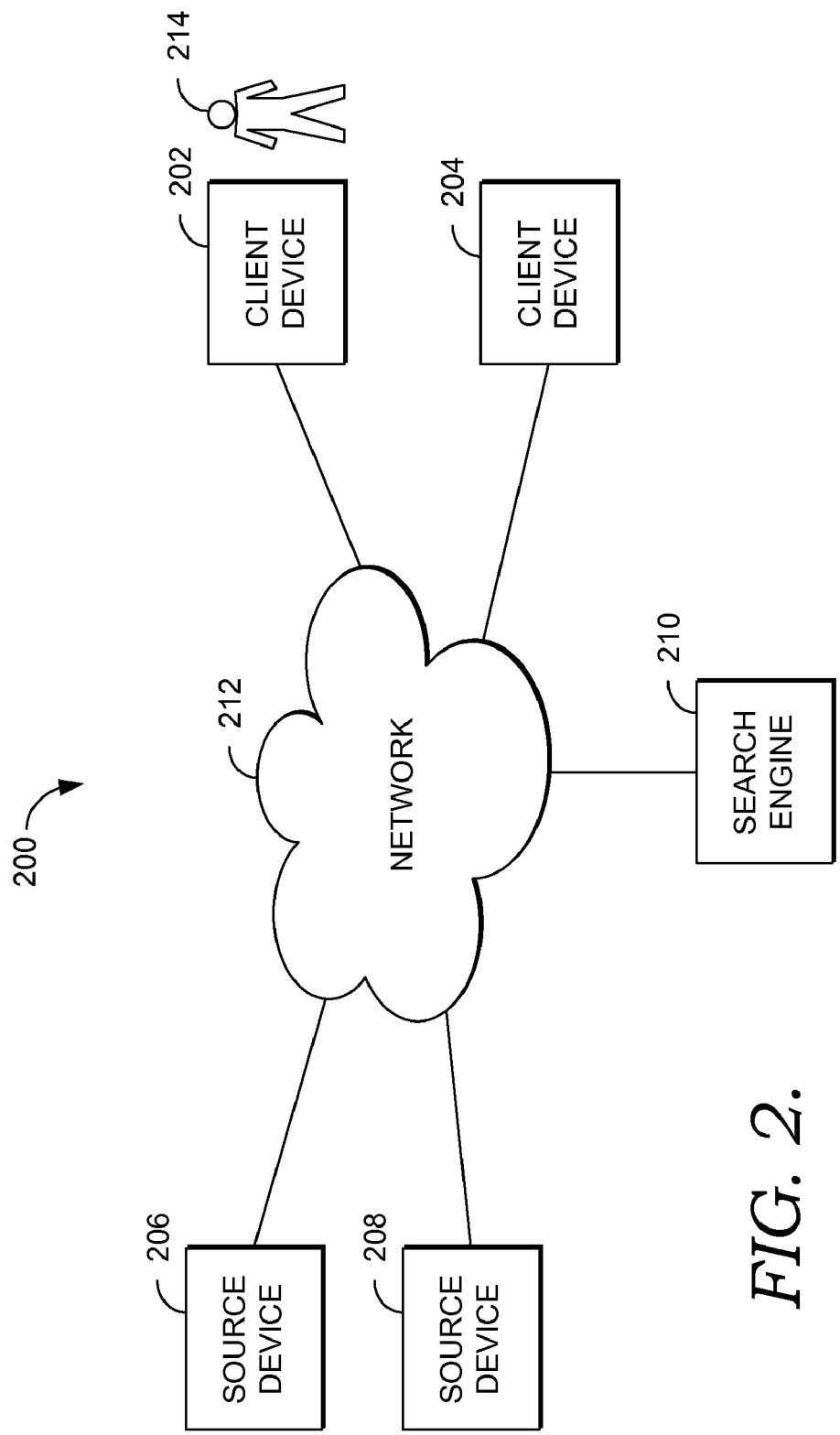
FIG. 2 is a block diagram of an exemplary system in which embodiments of the present invention may be employed.

Referring now to FIG. 2, a block diagram is provided illustrating an exemplary system 200 in which embodiments of the present invention may be employed. Among other components not shown, the system 200 may include multiple client devices, such as client devices 202, 204, multiple source devices, such as source devices 206, 208, and a search engine 210. Each of the client devices, source devices, and search engine may be any type of computing device, such as computing device 100 described with reference to FIG. 1, for example. The components may communicate with each other via a network 212, which may include, without limitation, one or more local area networks (LANs) and/or wide area networks (WANs). Such networking environments are commonplace in offices, enterprise-wide computer networks, intranets, and the Internet. It should be understood that any number of client devices, source devices, search engines, and networks may be employed within system 200 within the scope of the present invention. Additionally, components of the system 200 may comprise a single device or multiple devices in a distributed environment. For instance, a single device or multiple distributed devices may provide the functionality of the search engine 210 described herein.

Source devices, such as the source devices 206, 208, may maintain a variety of data for different products. For example, a source device may be a server for a consumer electronics retailer. The server may contain data regarding products offered by the retailer, such as televisions and computers, for example. Each source device may function as either a feed source or a crawl source (although some source devices may serve as both a feed source and crawl source). Feed source devices provide specific product data to the search engine 210, typically in a structured format understandable by the search engine 210. For example, a server may provide an XML feed that contains distinct attributes of products offered by a retailer. In contrast, crawl source devices do not provide such feeds but merely maintain documents that include product information. The search engine may access the data by crawling documents on these source devices. For example, referring to the previous consumer electronics scenario again, such a source device may be a server that maintains a website for the consumer electronics retailer. Data relating to consumer electronics offered by the retailer may be accessed by crawling the website.

The search engine 210 accesses product information from the various source devices, such as the source devices 206, 208. The product information includes both structured data received from feed sources and data crawled from documents at crawl sources. The product information is aggregated and product entities are identified within the aggregate product information. In some embodiments, the search engine 210 identifies product entities within particular product classes and determines correlations among the product entities for each product class. A product class detail page is then generated for each product class based on information available for the product entities within the product class and the identified correlations among those product entities. In other embodiments, the search engine identifies for each product entity, other product entities that have a relationship with the product entity. For instance, for a given product entity, competing product entities from other brands may be identified. Additionally, upgraded and downgraded product entities from the same brand as the given product entity may be identified.

The search engine 210 may receive search queries from users, such as the user 214, via client devices, such as the client devices 202, 204. In response to a search query that indicates a user is searching for product information, the search engine provides results that allow users to discover and navigate products. In one embodiment, in response to a search query that includes search terms corresponding with a product class, the search engine 210 provides a product class detail page as a search result. In some embodiments, a link to the product class detail page may be provided as an "instant answer" with other general web search results on a search results page returned by the search engine 210. In other embodiments, the search engine may provide the product class detail page without providing a search results page.

In some embodiments, the search engine 210 provides product relationship information for a given product entity. For instance, the search engine 210 may receive a search query that includes terms corresponding with the given product entity. In response to the search query, the search engine provides relationship information for the given product entity. In some cases, the search engine 210 may include a link to the product information as a search result with other general web search results. In other cases, the search engine 210 may directly provide a product entity detail page with the product relationship information. In some embodiments, a user may navigate to the product entity detail page by selecting a particular product entity from a product class detail page that includes a variety of different product entities.

Figure 3:
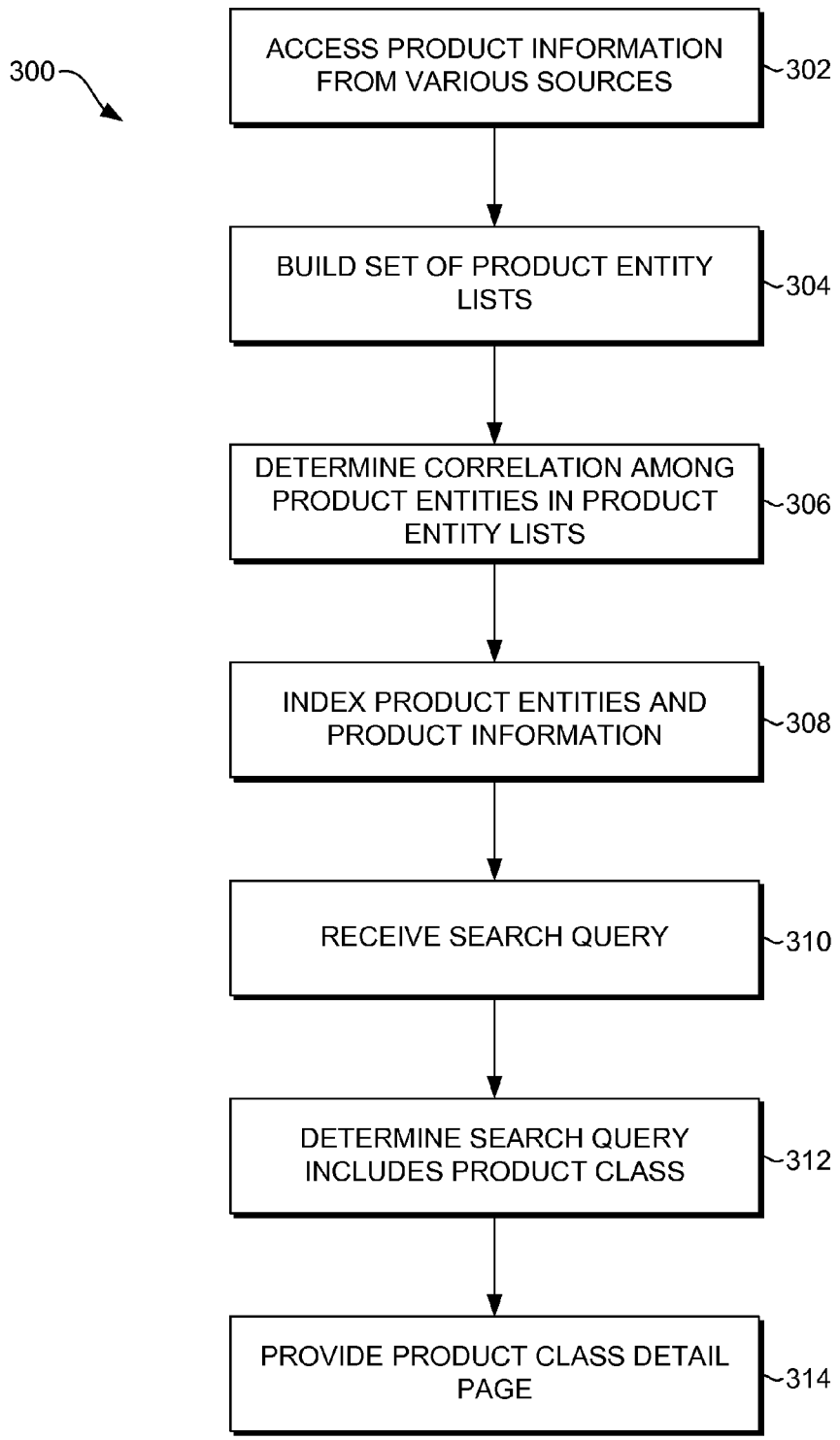
FIG. 3 is a flow diagram showing a method for aggregating product information and generating a product class detail page providing information for product entities within a given product class in accordance with an embodiment of the present invention.

As indicated above, in one embodiment of the present invention, product relationship information is derived for product classes to provide users with a holistic view of product entities for a given product class the user is researching. Turning to FIG. 3, a flow diagram is provided illustrating a method 300 for aggregating product information and generating a product class detail page providing information for product entities within a given product class in accordance with an embodiment of the present invention. Initially, as shown at block 302, product information is accessed from a variety of different sources. This includes crawling web pages that contain product information, including, but not limited to, editorial/blog posts, product news, manufacturer's specifications, user and expert reviews, discussion forums, and buying guides. Web logs, including but not limited to, query logs, user-click-through logs, user purchasing logs, are additional sources of information that may be accessed. Additionally, authoritative data is accessed, such as product hierarchy information and data feeds. The product information from the various sources is combined to produce an aggregate input data set.

As shown at block 304, a set of product entity lists is built using the product information in the aggregate input data set. In particular, product entities are identified from the product information. Each product entity represents a given product. For each product entity, a variety of product information is identified, including, for instance, brand, product class, product model name, and product features. The product entity list comprises a list of the identified product entities.

Product entities are extracted from the set of product entity lists and their correlation within the set is computed, as shown at block 306. Correlations among product entities may be determined in a variety of different manners within the scope of embodiments of the present invention. By way of example only and not limitation, in one embodiment, correlations between product entities may be determined by evaluating the text of web documents, as will be described in further detail below. For instance, if two product entities are discussed within the text of a web document, a correlation between the product entities may be inferred. The closer the proximity of the product entities in the web document (e.g., same sentence, same paragraph, etc.) may help determine the extent of the correlation between the product entities.

The product entities and their descriptive information are put in a generic, structured database and indexed, as shown at block 308. Accordingly, users may query the index using keywords, allowing relevant product information to be returned based, for instance, on relevance and importance. This allows users to discover product entities and their related information.

In the embodiment shown in FIG. 3, the product entity data is incorporated into a web search user experience. As shown at block 310, a search query is received at a web search engine. The search query includes keywords that are directed to a particular product class. For instance, a user may enter the search terms "digital camera" as a search query. The search engine determines that the search query includes a product class (e.g., "digital camera"), as shown at block 312.

Based on the determination that the search query includes a particular product class, the search engine provides a product class detail page for that particular product class as a result for the user's search, as shown at block 314. For instance, if the user provides a search query that includes "digital camera," a product class detail page for digital cameras is provided. In one embodiment, the search engine provides a search results page to the user that includes a list of general web search results using the search query, as well as a link to a product class detail page for the product class identified in the search query. For instance, the link to the product class detail page may be provided above the search results as an "instant answer." The user may select the link to navigate to the product class detail page. In another embodiment, based on a determination that the user is seeking information for a given product class, instead of providing a search results page, the search engine navigates the user to the product class detail page directly, without providing a search results page.

The product class detail page displays information regarding a set of related product entities for the identified product class. The product class detail page is generated based on the aggregate input data set accessed from the various sources and includes information regarding correlations determined among various product entities within the product class. The product class detail page displays a set of related products based on a variety of dimensions, such as, for instance, competing products, products grouped by product lines, and similar products based on certain feature sets. Accordingly, the user may view the product class detail page to discover and compare products across brands, product lines, and product classes, for instance. In some embodiments, the product class detail page is dynamically generated when a search query is received by querying the product index previously built from the aggregate input data. In some embodiments, some data may be pre-calculated in advance to facilitate performance. In further embodiments, product class details pages may be built in advance of queries and stored for retrieval when a search query is received. Any and all such variations are contemplated to be within the scope of embodiments of the present invention.

Figure 4:
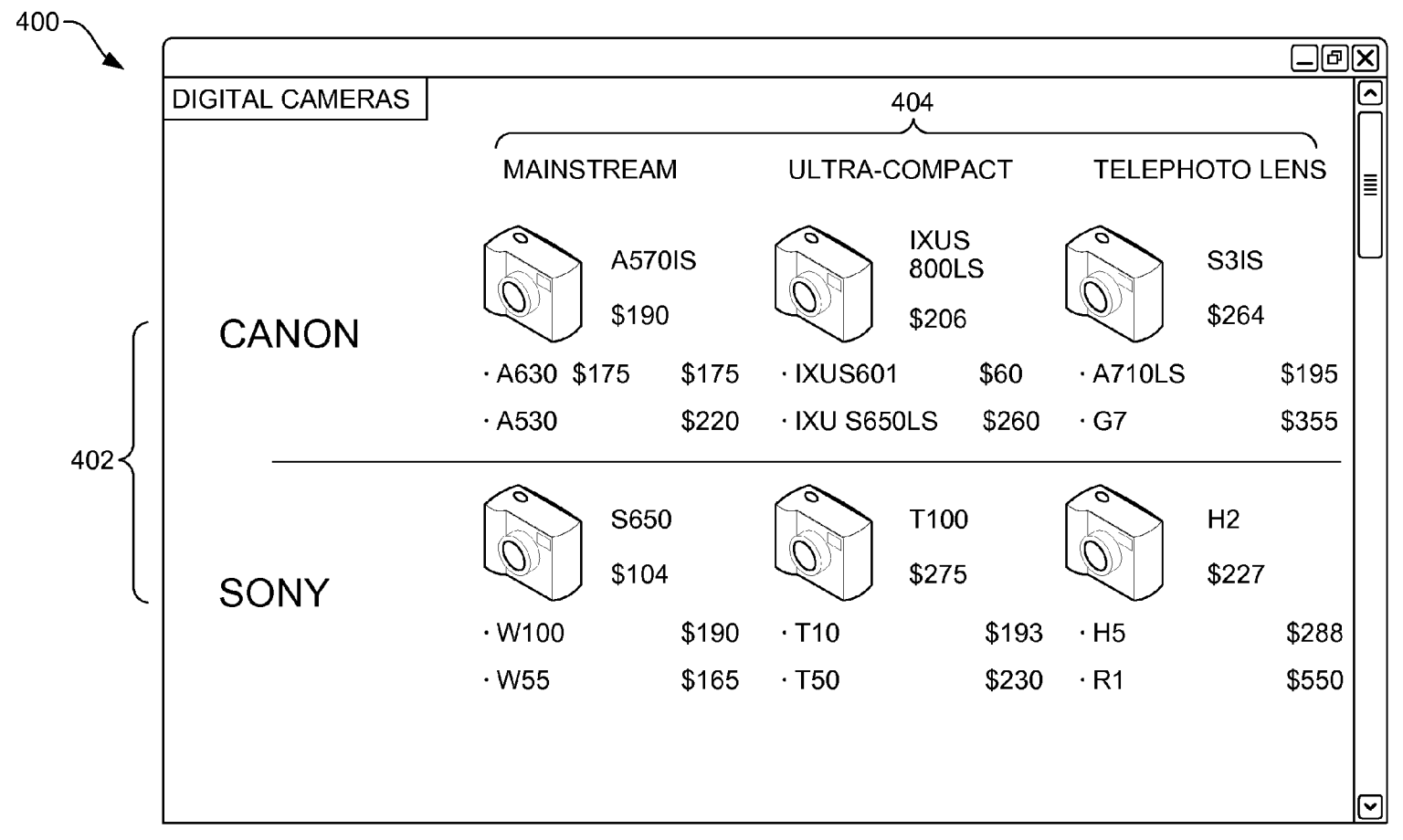
Figure 5:
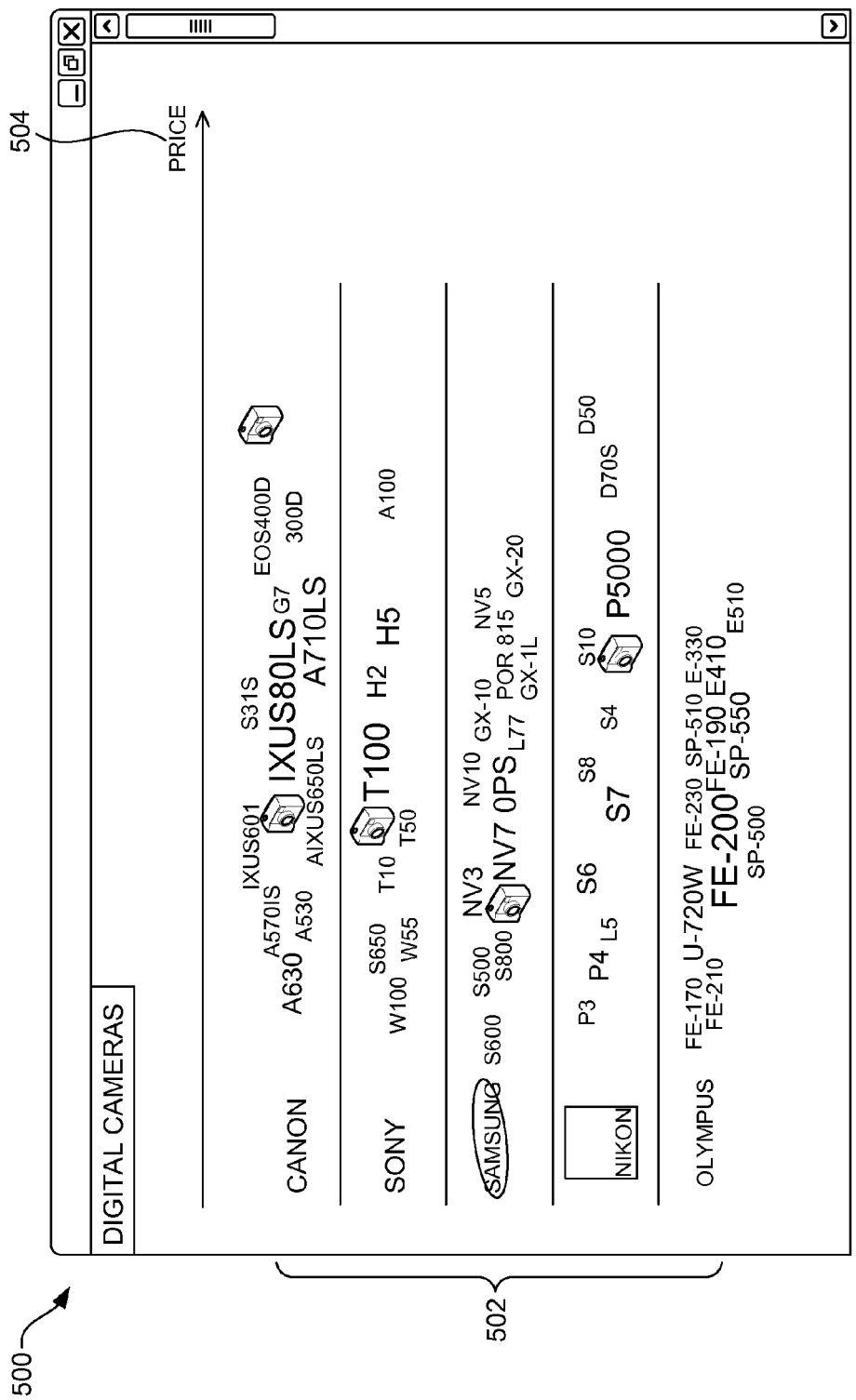
FIG. 5 is an illustrative screen display showing a product class detail page in accordance with another embodiment of the present invention.

Examples of product class detail pages are provided in FIGS. 4 and 5, which include exemplary screen displays. It will be understood and appreciated by those of ordinary skill in the art that the screen displays of FIGS. 4 and 5 are provided by way of example only and are not intended to limit the scope of the present invention in any way.

Referring initially to FIG. 4, a screen display is provided illustrating an exemplary product class detail page 400 in accordance with an embodiment of the present invention. In FIG. 400, a product class detail page 400 is shown for digital cameras. The product class detail page 400 organizes product entities (i.e., digital camera models) for the product class in a brand 402 versus product line 404 matrix. A product entity is identified in the matrix using the model name for the product entity. Each column of the matrix includes digital camera entities for a given digital camera brand, and each column includes digital cameras determined to fall within a given product line for the various brands. The matrix also highlights the most popular and/or important model for each brand and product line combination, by listing the product entity first and including an image of the digital camera.

A product class detail page 500 in accordance with another embodiment of the present invention is shown in FIG. 5. The product class detail page 500 of FIG. 5 applies the concept of tag-clouds to product class information. In particular, the product class detail page 500 groups product entities into brands 502. Each product entity is represented in the user interface by its product model name. Product entities are located based on price 504 and are displayed in text/image sizes relative to their popularity/importance. In one embodiment, product details for a product entity are presented in a text box overlay when the user places a mouse cursor over the product entity's representation in the user interface. Although the product class detail page 500 of FIG. 5 illustrates an approach in which product entities are arranged based on price, in other embodiments, product entities may be arranged based on other relevant features for the product class. For instance, digital cameras could be located based on other features, such as photo quality, digital zoom, optical zoom, resolution (e.g., number of megapixels), and size.

In another embodiment of the present invention, specific relationships are identified between a target product entity and other product entities. For instance, for a given digital camera model, an upgraded digital camera model and downgraded digital camera model may be identified within the same brand. An older and/or newer version of the digital camera model may also be identified. Additionally, competing digital camera models from other brands may be identified. A user interface is then generated for the target product entity that presents the relationships with other product entities. Users may then view the product relationships for the target product entity.

Figure 6:
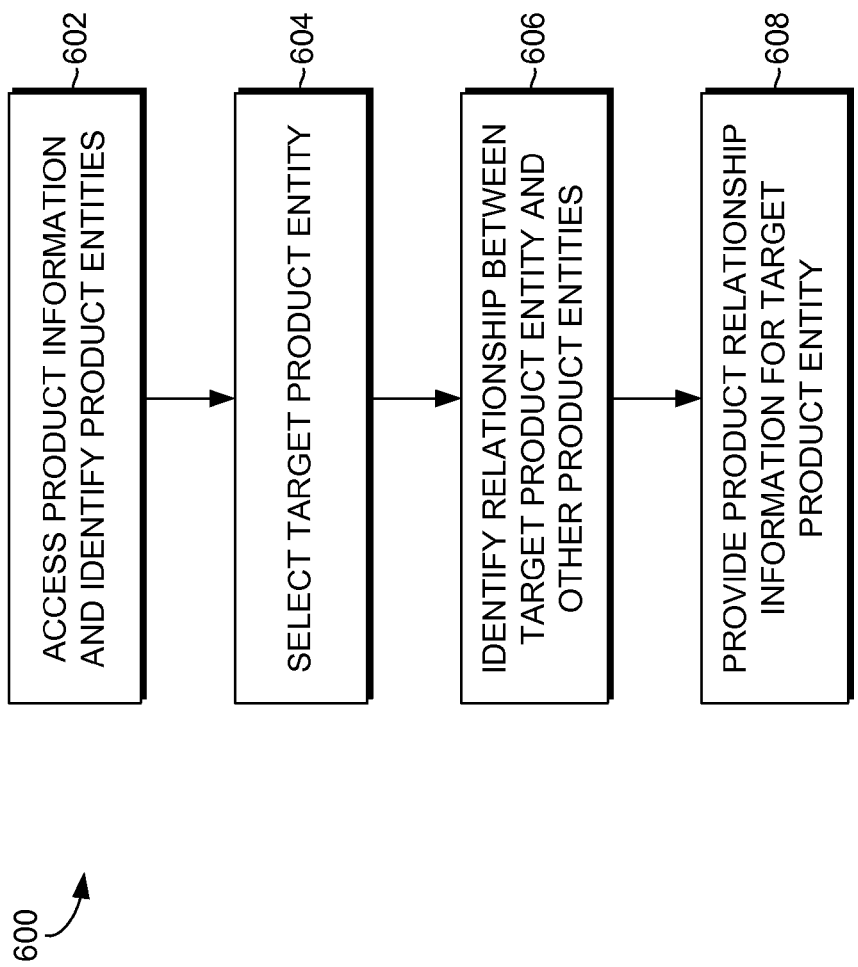
FIG. 6 is a flow diagram showing a method for providing product relationship information for a target product entity in accordance with an embodiment of the present invention.

Turning to FIG. 6, a flow diagram is provided illustrating a method 600 for providing product relationship information for a target product entity in accordance with an embodiment of the present invention. Initially, as shown at block 602, product information is accessed and product entities are identified within the product information. The product information may be accessed and product entities identified similar to blocks 302 and 304 of FIG. 3. The product information may be accessed from a variety of different sources, including both crawled sources and feed data sources.

A target product entity is selected at block 604. Relationships with other product entities are identified for the target product entity, as shown at block 606. In various embodiments of the present invention, these relationships may include upgraded and downgraded product entities within the same product brand for the target product entity, a newer and/or older version of the target product entity, and/or one or more competitor product entities from other product brands.

Product entity relationships may be identified in a number of different manners within the scope of embodiments of the present invention. Any and all such variations are contemplated to be within the scope of embodiments of the present invention. In some embodiments, product relationships may be identified by analyzing feature information for product entities within a given product class. For instance, if the product entity is a digital camera, features such as price, photo quality, digital zoom, optical zoom, resolution, and size, may be compared between the given digital camera and other digital cameras. Digital cameras from other brands having similar features as the given digital camera may be identified as competitors. Digital cameras from the same brand that have improved features (e.g., higher price, higher resolution, etc.) may be identified as upgrades, while digital cameras from the same brand that have reduced features (e.g., lower price, lower resolution, etc.) may be identified as downgrades.

Referring to FIG. 7, a flow diagram is provided illustrating a method 700 for using feature information to identify product relationships. As shown at block 702, feature information is accessed for a target product entity being analyzed. Additionally, feature information is accessed for other product entities within the same product class as the target product entity, as shown at block 704. In embodiments, the feature information may be stored as feature/value pairs associated with each product entity. Each feature/value pair specifies a given feature and a value for that feature for the product entity. For instance, the feature/value pairs for a particular digital camera may include: price:$500; resolution: 7 megapixels; optical zoom: 3 times; etc.

As shown at block 706, relationships between the target product entity and other product entities are identified using the feature information. In some embodiments, all features may be considered when determining relationships, while in other embodiments, only a subset of features are used to determining relationships. In some embodiment, some features for a given product class may be deemed more important and may be weighted more heavily for determining product relationships. Accordingly, the process of identifying relationships between a target product entity and other product entities may include identifying the importance of features for the product class and applying weighting based on each feature's importance.

In some embodiments, product relationships may be identified by analyzing the text of crawled documents. For instance, if two product entities are identified as being within close proximity of each other in a document, a relationship between those two product entities may be inferred. Additionally, words and phrases located in close proximity of identified product entities may also be used to infer relationships between the product entities. For instance, suppose a user review includes the text: "product A is very similar to product B, but I prefer . . . ." Based on the language "similar to" being used in conjunction with product A and product B within the user review, product A and product B may be identified as competitor product entities.

To facilitate the identification of product relationships, in some embodiments, a dictionary of key words/phrases is generated and maintained. The dictionary includes key words/phrases that may be found in documents and used to identify a certain type of relationship among product entities. These key words/phrases may be identified as corresponding with a particular type of product relationship. By way of example only and not limitation, the dictionary may include key phrases such as "competitor of," "competes with," and "similar to" that correspond with a competitor-type relationship. Accordingly, when one of these phrases is found in conjunction with two are more product entities, the product entities may be identified as competing products.

Turning to FIG. 8, a flow diagram is provided showing a method 800 for identifying product relationships by analyzing text in crawled documents. As shown at block 802, two or more product entities are identified within the text of a crawled document. In some embodiments, the product entities may appear anywhere within the crawled document. In other embodiments, the product entities must be within a predetermined distance of one another. For instance, only product entities within a predetermined distance of 10 words may be considered for identifying product relationships.

As shown at block 804, key words/phrases indicative of a product relationship are identified within the crawled document. The key words/phrases may be identified by comparing the text of the crawled document to a dictionary of key words/phrases. In some embodiments, the key words/phrases may appear anywhere within the crawled document, while in other embodiments, the key words/phrases must be within a predetermined distance from the product entities. Based on the identified product entities and any identified key words/phrases found in the crawled document, a relationship between the product entities is determined, as shown at block 806.

Referring again to FIG. 6, as noted previously, product relationships between a target product entity and other product entities within the same product class are identified at block 606. During the process, one or more product entities may be identified as has having a relationship with the target product entity. In an embodiment, product entities may be competitors, upgrades, downgrades, and newer/older models. As shown at block 608, product relationship information is provided for the target product relationship, for instance, for presentation to a user performing research on the target product.

In an embodiment, a user interface is generated to present product relationships for the target product entity. In some embodiments, all product entities having a relationship with the target product entity may be included within the user interface. However, in some embodiments, the number of product entities included in the user interface may be limited. For instance, in one embodiment, only three competitor product entities, one downgrade product entity, one upgrade product entity, and one newer or older model product entity are included.

If only a portion of the product entities determined to have a relationship with the target product entity are included, a determination must be made regarding which of the related product entities to include. The determination may be based upon the strength of relationships between the target product entity and each of the other product entities. For instance, if ten product entities are identified as competitors but only three product entities may be included in a user interface, the three product entities identified as having the strongest competitor relationship with the target product entity may be selected. The strength of a relationship between a target product entity and another product entity may be based on a number of factors. For instance, the strength of the relationship may be algorithmically determined based on a number of factors including: proximity of product entities being mentioned within a web document; the number of web documents containing the product entities; key words found in text with product entities; and available editorial information.

Figure 9:
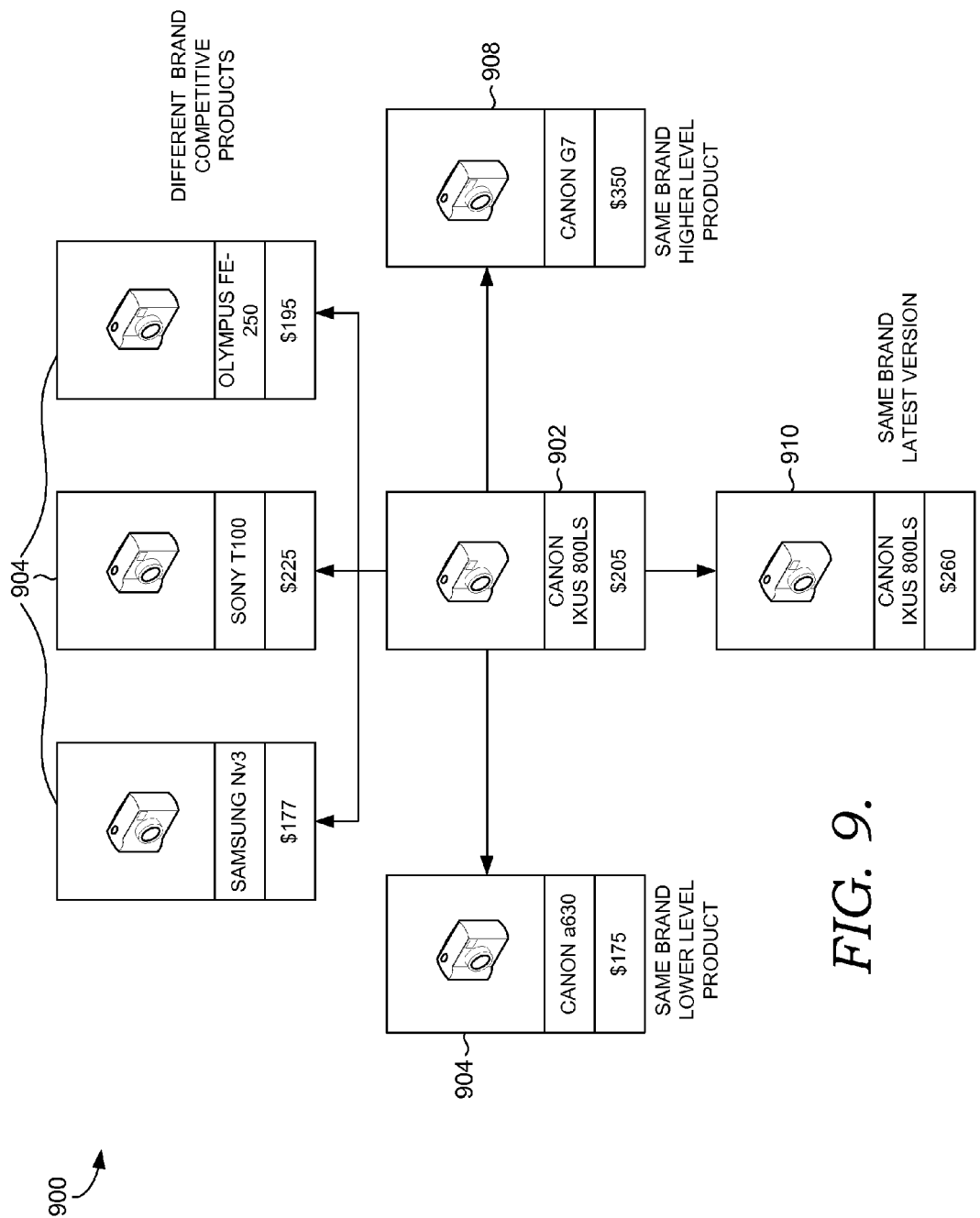
FIG. 9 is an illustrative screen display showing product relationships for a target product entity in accordance with an embodiment of the present invention.
Figure 10:
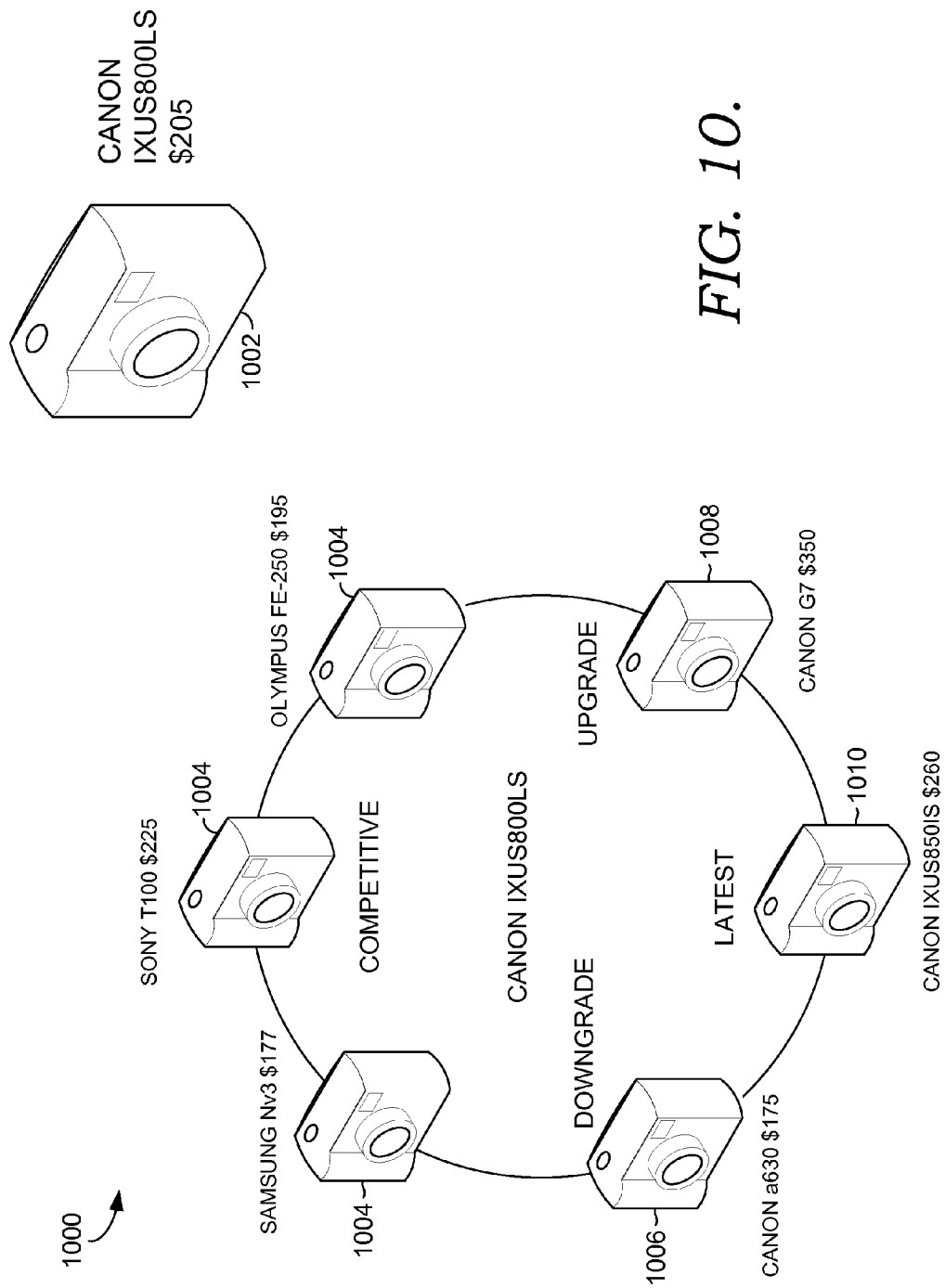
FIG. 10 is an illustrative screen display showing product relationships for a target product entity in accordance with another embodiment of the present invention.
Figure 11:
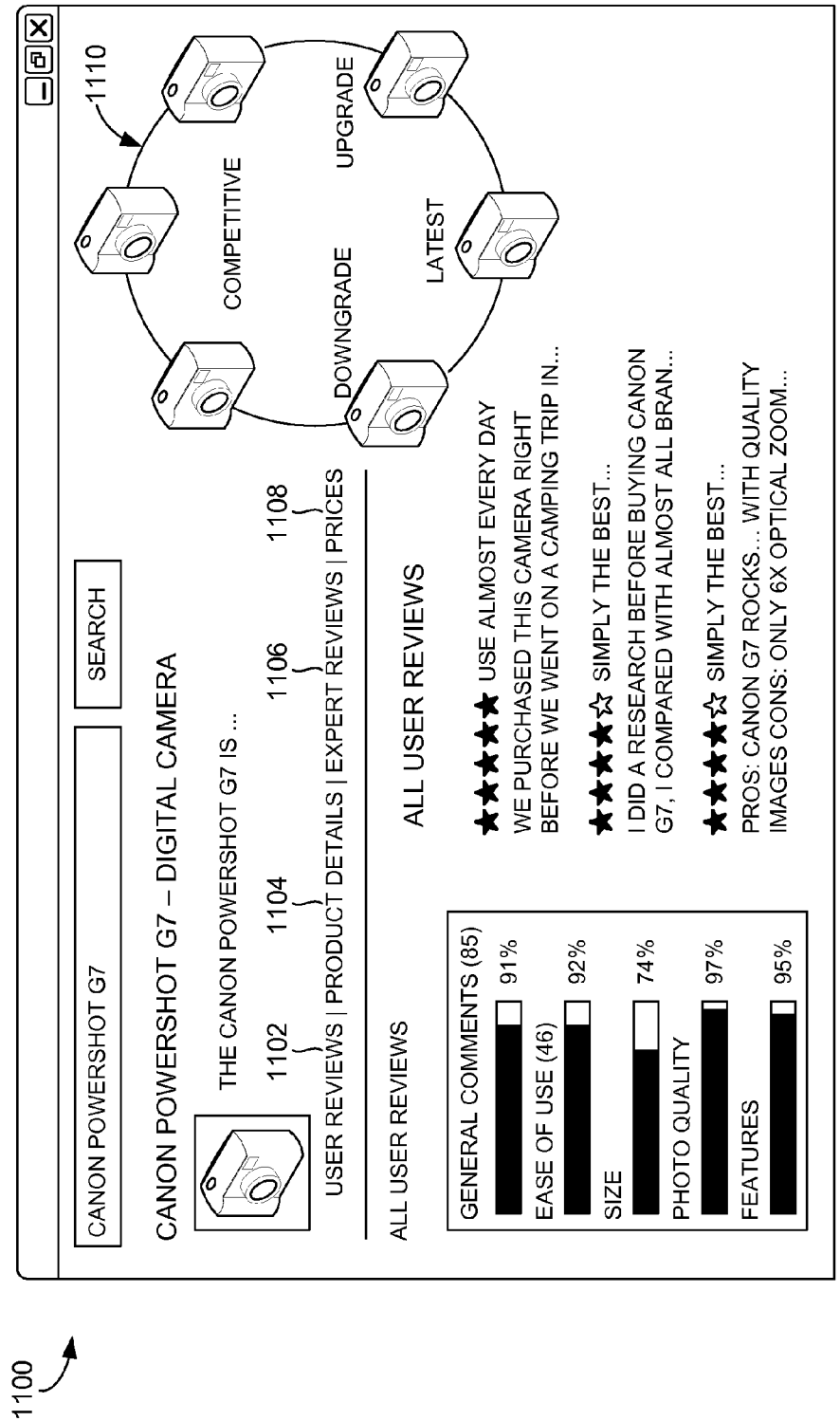
FIG. 11 is an illustrative screen display showing a product relationships for a target product entity on a product entity detail page in accordance with an embodiment of the present invention.

Examples of product relationship user interfaces are provided in FIGS. 9 through 11, which include exemplary screen displays. It will be understood and appreciated by those of ordinary skill in the art that the screen displays of FIGS. 9 through 11 are provided by way of example only and are not intended to limit the scope of the present invention in any way.

Referring initially to FIG. 9, a screen display is provided illustrating an exemplary product relationship user interface 900 in accordance with an embodiment of the present invention. In FIG. 9, a product relationship user interface 900 is shown for a Canon IXUS 800LS digital camera 900. The product relationship user interface 900 includes three competitive digital cameras from brands other than Canon 904, a lower level digital camera from Canon 906, a higher level digital camera from Canon 908, and a newer version of the selected digital camera 910. For each digital camera included in the product relationship user interface, an image, the brand and model name, and the price is indicated. One skilled in the art will recognize that the information included for each digital camera provided in FIG. 9 is for illustrative purposes only and information may be excluded and/or additional information included. Additionally, other numbers of product entities having a given relationship with a target product relationship may be included.

Referring to FIG. 10, a product relationship user interface 1000 is illustrated in accordance with another embodiment of the present invention. The product relationship user interface 1000 in FIG. 10 is shown for a Canon IXUS 800LS digital camera 1000 similar to that shown in FIG. 9. In particular, the product relationship user interface 1000 includes three competitive digital cameras from brands other than Canon 1004, a lower level digital camera from Canon 1006, a higher level digital camera from Canon 1008, and a newer version of the selected digital camera 1010. However, the related digital cameras are provided in a circular arrangement.

A product relationship user interface for a given product entity may be provided to users in a variety of different manners within the scope of embodiments of the present invention. In some embodiments, such as that shown in the screen display of FIG. 11, a product relationship user interface 1110 may be included in a product entity detail page 1100. The product entity detail page 1100 may be generated, for instance, using the information gathered from crawl and feed sources, such as that described hereinabove. As shown in FIG. 11, the product entity detail page provides a variety of information gathered from the various sources. Included are user reviews 1102, product details 1104, expert reviews 1106, and prices 1108.

In some embodiments, a product entity detail page may be included in a web search experience. For instance, a user may enter a search query that includes a product entity. For instance, in FIG. 11, the user has entered the search query "Canon Powershot G7." In some embodiments, the search engine returns a search results page that includes web search results using the search query, as well as an "instant answer" that provides a link to the product entity detail page 1100 shown in FIG. 11. In other embodiments, based on the identified product entity in the search query, the search engine may navigate directly to the product entity detail page 1100 shown in FIG. 11. In some embodiments, the user may first access a product class detail page that includes a variety of product entities for a given product class, as described hereinabove. The user may then select a particular product entity and be navigated to a product detail web page for the selected product entity.

As can be understood, embodiments of the present invention provide for a search system that allows users to discover and navigate product information and relationships. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-storage media storing computer-useable instructions embodied thereon that, when executed by one or more computing devices, cause the one or more computing devices to perform a method, the method comprising:

accessing an aggregate input data set of product information regarding a plurality of product entities, the product information being received from a plurality of sources of product information, the plurality of sources including feed sources and crawl sources;

identifying the plurality of product entities within the product information;

selecting a target product entity;

identifying a subset of other product entities having a relationship with the target product entity by examining text of documents from crawl sources, wherein the identifying the relationship between the target product entity and at least one other product entity comprises determining a proximity in a web document between a first portion of text mentioning the target product entity a second portion of text mentioning the at least one other product entity and accessing a dictionary to understand that an identified key phrase within the text of the documents indicates the at least one other product entity is an upgraded product of the target product entity, the key phrase being indicative of a product class;

using the proximity between the first and second portions of text to infer a correlation between a target product entity and at least one other product entity, wherein the correlation indicates the target product entity and the at least one other product entity are competitors;

providing product relationship information for presentation to a user, the product relationship information including the correlation inferred between the target product entity and the at least one other product entity and specifying the type of relationship;

wherein identifying the relationship between the target product entity and the at least one other product entity comprises determining that the target product entity and the at least one other product entity are identified within text of a crawled document and inferring the at least one relationship between the target product entity and the at least one other product entity based on the target product entity and the at least one product entity being identified within the text of the crawled document, wherein the at least one relationship between the target product entity and the at least one other product entity is inferred based on the target product entity being identified within a predetermined distance from the at least one other product entity within the text of the crawled document.

2. The one or more computer-storage media of claim 1, wherein identifying at least one relationship between the target product entity and the at least one other product entity comprises:

accessing feature information for the target product entity, the feature information for the target product entity including a plurality of feature-value pairs specifying values for a plurality of features of the target product entity;

accessing feature information for the at least one other product entity, the feature information for the at least one other product entity including a plurality of feature-value pairs specifying values for a plurality of features of the at least one other product entity;

identifying the at least one relationship between the target product entity and the at least one other product entity and the type of relationship by comparing at least a portion of the feature information for the target product entity against at least a portion of the feature information for the at least one other product entity.

3. The one or more computer-storage media of claim 2, wherein identifying the at least one relationship between the target product entity and the at least one other product entity and the type of relationship by comparing at least a portion of the feature information for the target product entity against at least a portion of the feature information for the at least one other product entity comprises:

identifying one or more features as important features for a type of product class of the target product entity and the at least one other product entity; and comparing feature information corresponding with the one or more important features for the target product entity and the at least one other product entity.

4. The one or more computer-storage media of claim 3, wherein identifying the at least one relationship between the target product entity and the at least one other product entity and the type of relationship by comparing at least a portion of the feature information for the target product entity against at least a portion of the feature information for the at least one other product entity includes weighting feature information.

5. The one or more computer-storage media of claim 4, wherein the feature information is weighted based on importance of each feature for a type of product class of the target product entity and the at least one other product entity.

6. The one or more computer-storage media of claim 1, wherein identifying at least one relationship between the target product entity and the at least one other product entity comprises:

determining that the target product entity and the at least one other product entity are identified within text of a crawled document;

identifying a key phrase within the text of the crawled document, the key phrase being indicative of the type of relationship between the target product entity and the at least one other product entity; and identifying the at least one relationship between the target product entity and the at least one other product entity based on the key phrase.

7. The one or more computer-storage media of claim 6, wherein identifying the key phrase within the text of the crawled document comprises comparing the text of the crawled document against a store of a plurality of key phrases, wherein each key phrase is associated with a type of relationship.

8. The one or more computer-storage media of claim 7, wherein identifying the at least one relationship between the target product entity and the at least one other product entity based on the key phrase comprises identifying the type of relationship between the target product entity and the at least one other product entity based on the key phrase, the type of relationship indicating that the at least one other product entity comprises one of the following: a competitor from a different brand than the target product entity; an upgrade in the same brand as the target product entity; and a downgrade in the same brand as the target product entity.

9. The one or more computer-storage media of claim 1, wherein providing product relationship information for presentation to a user comprises:
receiving a search query including one or more search terms;
determining that the one or more search terms correspond with the target product entity; and
providing the product relationship information within a product detail page in return to the search query.

10. A system comprising:
a processor;
computer-storage media storing computer-useable instructions embodied thereon that, when executed by the processor, perform a method comprising:
(1) accessing product information from a plurality of sources, the plurality of sources including feed sources and crawl sources;
(2) identifying a plurality of product entities within the product information;
(3) selecting a target product entity;
(4) identifying a subset of other product entities having a relationship with the target product entity by examining text of documents from crawl sources, wherein the relationship between the target product entity and an other product entity is determined by identifying that the target product entity is within a certain proximity in the text to the other product entity and by accessing a dictionary to understand that an identified key phrase within the text of the document indicates the other product entity is an upgraded product of the target product entity, the key phrase being indicative of a product class, wherein determining the relationship between the target product entity and the other product entity comprises determining that the target product entity and the other product entity are identified within text of a crawled document and inferring the at least one relationship between the target product entity and the other product entity based on the target product entity and the other product entity being identified within the text of the crawled document, wherein the at least one relationship between the target product entity and the other product entity is inferred based on the target product entity being identified within a predetermined distance from the other product entity within the text of the crawled document;
and
(5) providing product relationship information for the target product entity for presentation to a user, wherein the product relationship information includes the subset of other product entities having a relationship with the target product entity and specifies a type of relationship between the target product entity and each other product entity in the subset of product entities.

11. The system of claim 10, wherein the subset of other product entities having a relationship with the target product entity is identified by also comparing product feature information for the target product entity against product feature information for each of the other product entities in the subset of other product entities.

12. The system of claim 11, wherein features are weighted based on importance of the features for a product class of the target product entity and the other product entities.

13. The system of claim 10, wherein the type of relationship between the target product entity and an other product entity indicates that the other product entity is one of the following: a competitor from a different brand than the target product entity, an upgrade in the same brand as the target product entity, and a downgrade in the same brand as the target product entity.

14. The system of claim 10, wherein identifying the subset of other product entities having a relationship with the target product entity comprises identifying at least one competitive product entity from a different brand than the target product entity, identifying at least one upgraded product entity from the same brand as the target product entity, and identifying at least one downgraded product entity from the same brand as the target product entity.

15. The system of claim 10, wherein identifying the subset of other product entities having a relationship with the target product entity comprises determining a relationship strength between the target product entity and each of the plurality of product entities and selecting the subset of other product entities having the strongest relationship with the target product entity.

16. The system of claim 10, wherein providing product relationship information for the target product entity for presentation to a user, comprises:
receiving a search query including one or more search terms;
determining that the one or more search terms correspond with the target product entity; and
providing the product relationship information within a product detail page in return to the search query.

17. A method comprising:
accessing product information from user-click-through logs or user purchasing logs;
identifying product entities within the product information;
analyzing the user-click-through logs or user purchasing logs to determine correlations among product entities within the product information;
inferring that the product entity is similar to a second product entity based on the user-click-through logs or user purchasing logs;
indexing information regarding the product entities and the correlations among the product entities; and
generating a product class detail page by identifying a subset of product entities associated with a given product class and summarizing product information for the subset of product entities including correlations identified within the subset of product entities and an indication that the target product entity is similar to the second product entity,
wherein identifying the subset of product entities associated with a given product class comprises examining text of documents associated with one or more of the user-click-through logs and the user purchasing logs, wherein at least one of the correlations identified within the subset of product entities and the indication that the target product entity is similar to the second product entity is determined by identifying that the target product entity is within a certain proximity in the text to the second product entity and by accessing a dictionary to understand that an identified key phrase within the text of the document indicates the second product entity is an upgraded product of the target product entity, the key phrase being indicative of a product class, wherein determining that at least one of the correlations identified within the subset of product entities and the indication that the target product entity is similar to the second product entity comprises determining that the target product entity and the second product entity are identified within text of a crawled document and inferring the at least one relationship between the target product entity and the second product entity based on the target product entity and the second product entity being identified within the text of the crawled document, wherein the at least one relationship between the target product entity and the second product entity is inferred based on the target product entity being identified within a predetermined distance from the second product entity within the text of the crawled document.

18. The method of claim 17, wherein the method further comprises:
   receiving a search query including one or more query terms;
   determining that the one or more query terms include a type of product class;
   determining that the type of product class included in the one or more query terms corresponds with the given product class associated with the product class detail page; and
   providing the product class detail page in return to the search query for presentation to a user.

* * * * *